Dec. 19, 1950     H. W. HAPMAN     2,534,967
EXERCISING STAND FOR BICYCLES
Filed Aug. 14, 1948
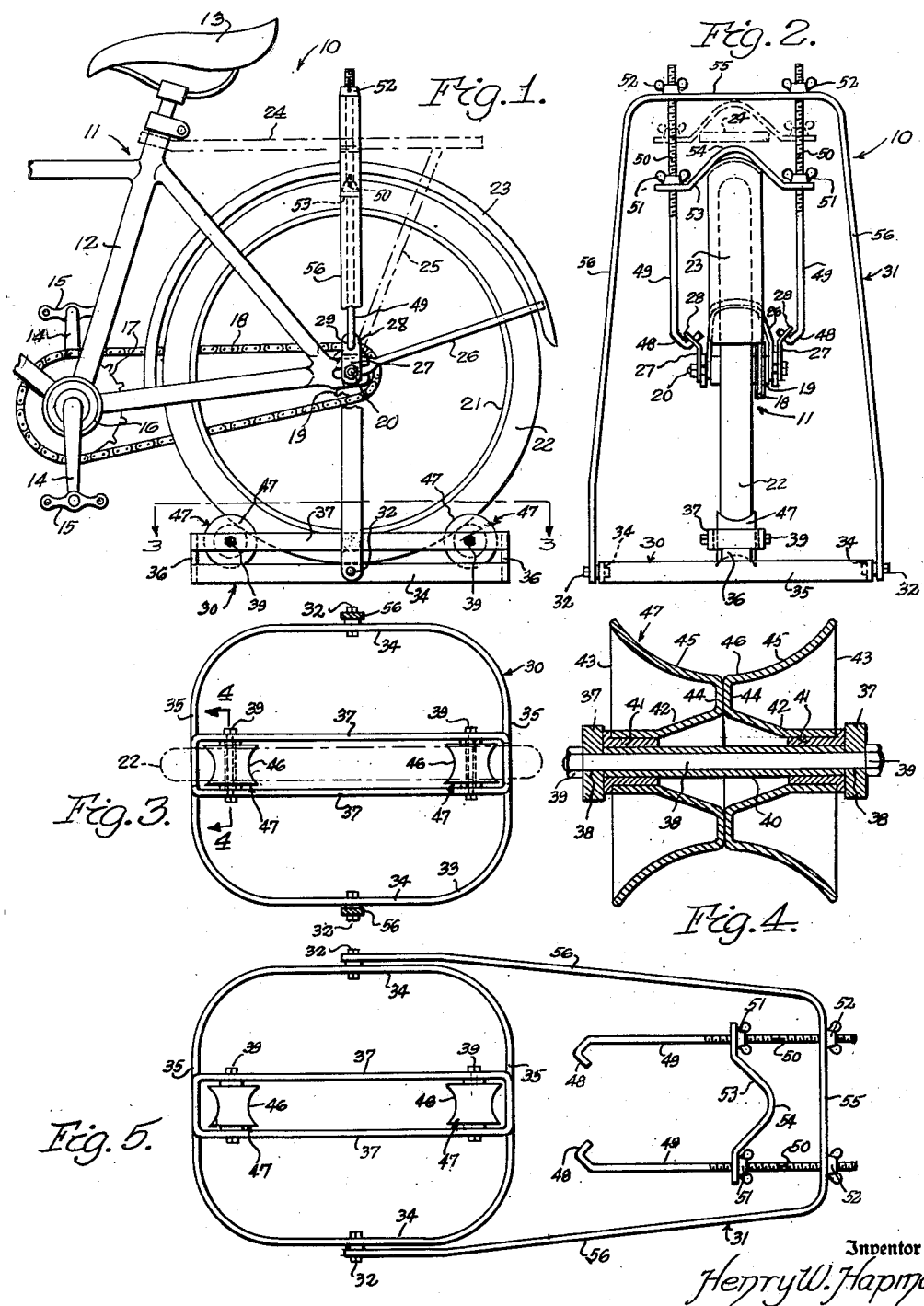
Inventor
Henry W. Hapman
Barthel & Bugbee
Attorneys Patented Dec. 19, 1950

2,534,967

UNITED STATES PATENT OFFICE 2,534,967

EXERCISING STAND FOR BICYCLES

Henry W. Hapman, Detroit, Mich.

Application August 14, 1948, Serial No. 44,317

2 Claims. (Cl. 272—73)

This invention relates to exercising devices, and in particular, to exercising stands for bicycles.

One object of this invention is to provide an exercising stand for bicycles wherein an ordinary bicycle may be quickly and easily mounted on the stand and used for exercising, after which it may be as quickly and as easily detached from the stand and used for its normal purposes without any material alteration.

Another object is to provide an exercising stand for bicycles wherein the rear wheel of the bicycle is adjustably suspended from the stand in such a manner as to exactly control the pressure which the tire exerts on a pair of spaced rollers, so that the weight of the bicycle and its rider may be counteracted to any desired extent and whereby this counteracting adjustment may be made by the rider without leaving his seat on the bicycle.

Another object is to provide an exercising stand for bicycles which is instantly foldable into a substantially flat shape so that it occupies the minimum space in storage.

Another object is to provide an exercising stand for bicycles wherein the rear wheel of the bicycle is suspended from an arch-shaped bale pivoted to a floor frame carrying a pair of spaced rollers in such a manner that the bale automatically adjusts itself to a midway position relatively to the rollers so that both rollers take an equal share of the load.

In the drawings:

Figure 1 is a side elevation of an exercising stand for bicycles according to a preferred form of the invention, with the supporting bale broken away to show the connection of the suspending rods to the rear axle of a conventional bicycle;

Figure 2 is a rear elevation of the exercising stand and bicycle shown in Figure 1;

Figure 3 is a horizontal section along the line 3—3 in Figure 1;

Figure 4 is a vertical secion along the line 4—4 in Figure 3; and

Figure 5 is a top plan view of the exercising stand of Figures 1 and 2 with the bale swung down into substantially the same plane as the base frame for storage purposes.

Medical and health authorities agree that bicycle riding is one of the most healthful forms of exercising available. The riding of a bicycle under present-day conditions, however, is hazardous because of streets and highways crowded with swiftly moving motor vehicle traffic. Weather conditions, moreover, often do not permit bicycle riding at the time when the would-be exerciser is able or willing to ride. Certain indoor exercising devices utilizing the principles of the bicycle have been devised and are used to some extent in gymnasiums and health studios. Their widespread use, however, has been retarded by the fact that their specialized construction results in a high cost and, therefore, an extremely high price. Furthermore, the device is good only for indoor exercise or exercise in a stationary location out of doors, as the device cannot be ridden as an ordinary bicycle from place to place. Finally, the special exercising devices occupy a considerable amount of space and it is difficult to find sufficient storage space in the modern house.

The present invention provides a foldable exercising stand upon which an ordinary bicycle may instantly be mounted for use as an exerciser yet from which it may be instantly detached and used for travel without difficulty. The only addition or alternation necessary to make to the bicycle is to bolt a pair of small clips to the rear axle, one on each end, these clips having holes through which the hook-like lower ends of suspension rods are inserted. These suspension rods at their upper ends pass through an arch-like bale which is pivoted to a floor frame, and are threaded to receive wing nuts by which the suspension rods may be raised and lowered. The tire of the rear wheel of the bicycle rests on a pair of spaced rollers, but the ordinary defect of such arrangements is eliminated by the use of the suspension rods.

Hitherto, it has been found that if a bicycle is allowed to rest on rollers, an operator attempting to pedal the bicycle finds it almost impossible to apply enough force to operate the bicycle because of the friction between the tire and the rollers and because of the very slight amount of force which is actually exerted at the periphery of the tire. The present invention, by suspending the rear wheel of the bicycle from a U-shaped frame or bale by means of the suspension rods, takes the weight of both bicycle and rider off the tire to any desired extent, leaving only a slight load to be borne by the supporting rollers and hence developing only a slight amount of friction, thus making it very easy for the rider to operate the bicycle.

Referring to the drawings in detail, Figure 1 shows an exercising stand generally designated 10, according to a preferred form of the present invention, upon which a conventional bicycle, generally designated 11, is mounted in the manner described below. The bicycle 11 consists of the usual frame 12 with a saddle 13 mounted on the upper part thereof, a pair of cranks 14 with pedals 15 mounted thereon. The cranks 14 with their connecting shaft are rotatably supported in the usual crank bearing 16 and carry a drive sprocket 17. An endless chain 18 encircles the sprocket 17 and also a driven sprocket 19 on the rear axle 20, the sprocket 18 driving the bicycle wheel 21 with its tire 22. The bicycle may also be optionally equipped with a mud guard 23 and a luggage carrier platform 24 secured to the frame 12 beneath the saddle 13, and having struts 25 extending down to the rear axle 20. The mud guard 23 also has the usual struts 26 likewise extending to the rear axle 20.

In order to attach the bicycle 11 to the exercising stand 10, a pair of angle clips 27 (Figures 1 and 2) are bolted to the rear axle 20 at opposite ends thereof. The clips 27 remain with the bicycle at all times and offer no interference with its normal use. The upper ends of the clips 27 are bent as at 28 and provided with apertures 29 by which the bicycle 11 is suspended from the exercising stand 10 in the manner explained below.

The exercising stand 10 consists generally of a horizontal base 30 and a vertical approximately U-shaped suspension frame 31 pivoted on the pivot bolts 32 to the base 30. The base 30 includes an open frame 33 of roughly rectangular outline with rounded corners, this frame 33 being thus of orbital shape. The pivot bolts 32 are attached to the side portions 34 of this frame 33 (Figure 3) whereas from the end portions 35 rise plate-like uprights 36 welded or otherwise secured thereto. Interconnecting the uprights 36 and secured thereto as by welding are parallel side bars 37 which are bored as at 38 near their opposite ends (Figure 4) to receive axle bolts 39.

The axle bolts 39 extend between the side bars 37 and each is covered by a tubular member 40 upon the opposite ends of which flanged collars 41 are mounted, these in turn supporting the inner flanges 42 of wheel halves 43. The inner flanges 42 extend toward one another to parallel annular webs 44 from which in turn they extend outward again in cooperating arcuate portions 45 coextensive with one another so as to form grooves 46 in grooved rollers or pulleys, generally designated 47. The axle bolts 39 and consequently the grooved rollers 47 are placed at such separations along the side bars 37 as to receive the ordinary bicycle wheel 21 and tire 22 without permitting the latter to collide with the floor or ground. The tire 22 of course fits the grooves 46 in the rollers 47 in the manner shown in Figures 1 and 2.

Hooked into the apertures 29 in the bent portions 28 of the clips 27 are the hooked lower ends 48 of suspension rods 49, the upper end portions of which are threaded as at 50 to receive lower and upper wing nuts 51 and 52 respectively. Mounted beneath the lower wing nuts 51 and bored at its opposite ends to receive the suspension rods 49 is a looped bridge member 53, the central loop portion 54 of which fits either the bicycle mudguard 23 or the luggage rack 24 as shown by the solid lines and dotted lines respectively in the upper portion of Figure 2. The horizontal portion 55 of the U-shaped vertical suspension frame 31 is also bored at spaced locations for the passage of the suspension rods 49 (Figure 2) immediately beneath the upper wing nuts 52. The side portions 56 of the U-shaped frame 31 are inclined slightly inward from bottom to top so as to give it roughly the outline of a truncated triangle or trapezoid.

In the use of the invention, the U-shaped frame 31 is swung upward from the storage position of Figure 5 to the operating position of Figures 1 and 2, and the bicycle 11 is backed into position with its rear tire 22 resting upon the rollers 47. The suspension rods 49 are then lowered by loosening the wing nuts 51 and 52 until the hook portions 48 at the lower ends thereof enter the holes 29 in the outwardly bent portions 28 of the clips 27 (Figure 2). The bridge member 54 is then lowered upon the mudguard 23 or luggage rack 24, as the case may be, and the lower wing nuts 51 tightened to firmly hold the bicycle 11 in position. The upper wing nuts 52 are then tightened to take part of the weight of the bicycle off the rollers 47 and thus to suspend the rearward portion of the bicycle 11 from the U-shaped vertical frame 31.

The rider then mounts the bicycle in the usual way and operates the pedals 15 to rotate the rear wheel 21. If the resistance is too great, he tightens down on the upper wing nuts 52, lifting the rearward portion of the bicycle 11 still further off the rollers 47 and lessening the resistance. The rider may do this without leaving the saddle 13, merely by turning around and reaching for the wing nuts 52 which are within easy access. Since the vertical frame 31 is pivoted as at 32 to the base 30, the weight of the bicycle and rider are equally distributed between the rollers 47. The rider then rides the bicycle in the usual way and obtains exercise to any desired extent without leaving his home. After he has finished his exercising, he may leave the bicycle in the position shown in Figures 1 and 2. If, on the other hand, he wishes to use the bicycle for travel, he merely loosens the wing nuts 51 and 52 to drop the hooked portions 48 of the suspension rods 49 out of the holes 29 in the clips 27, whereupon the bicycle may be ridden away. The vertical frame 31 may then be folded down into the flat position of Figure 5, if desired, so that it occupies the minimum space for storage.

In securing the bicycle to the stand by means of the bridge member 54 and wing nuts 51, it is preferable to tighten the lower wing nuts 51 before the rider mounts the bicycle. The upper wing nuts 52, however, can be tightened or loosened after the rider has mounted the bicycle, thereby lightening the load and consequently the indentations which the rollers 47 make in the bicycle tire 22, which indentations ordinarily increase the difficulty of riding the bicycle by the resistance set up by the continuous flexing of the tire required.

What I claim is:

1. An exercising stand for bicycles comprising a base adapted to rest upon a supporting surface, a pair of rollers journaled on said base in spaced relationship and separated from one another a sufficient distance to support the rear wheel of a bicycle out of contact with said supporting surface, a frame structure connected to said base on opposite sides of said wheel and extending upward therefrom, and a bicycle suspension structure depending from the upper portion of said frame structure and attachable to said bicycle adjacent said rear wheel, said suspension structure including adjusting mechanism for altering the length thereof from said frame structure.

2. An exercising stand for bicycles comprising a base adapted to rest upon a supporting surface, a pair of rollers journaled on said base in spaced relationship and separated from one another a sufficient distance to support the rear wheel of a bicycle out of contact with said supporting surface, a frame structure connected to said base on opposite sides of said wheel and extending upward therefrom, and a bicycle suspension structure including suspension rods depending from the upper portion of said frame structure on opposite sides of the bicycle wheel and attachable to said bicycle adjacent said rear wheel, said suspension rods including adjusting devices for raising and lowering said rods relatively to said frame structure.

HENRY W. HAPMAN.

REFERENCES CITED

The following references are of record in the file of this patent:

UNITED STATES PATENTS

| Number | Name | Date |
|---|---|---|
| 574,167 | Ray | Dec. 29, 1896 |
| 604,200 | Vogeler | May 17, 1898 |
| 1,621,120 | Lee | Mar. 15, 1927 |

FOREIGN PATENTS

| Number | Country | Date |
|---|---|---|
| 7,531 | Great Britain | Mar. 23, 1897 |
| 17,570 | Great Britain | Aug. 15, 1898 |